(12) United States Patent
Daxauer et al.

(10) Patent No.: US 8,502,991 B2
(45) Date of Patent: Aug. 6, 2013

(54) METHOD FOR THE DETERMINATION OF THE 3D COORDINATES OF AN OBJECT

(75) Inventors: Herbert Daxauer, Alchsee (AT);
Thomas Mayer, Kolbermoor (DE);
Christian Thamm, Rosenheim (DE)

(73) Assignee: Steinbichler Optotechnik GmbH,
Neubeurn (DE)

( * ) Notice: Subject to any disclaimer, the term of this patent is extended or adjusted under 35 U.S.C. 154(b) by 358 days.

(21) Appl. No.: 12/832,528

(22) Filed: Jul. 8, 2010

(65) Prior Publication Data
US 2011/0007326 A1 Jan. 13, 2011

(30) Foreign Application Priority Data
Jul. 8, 2009 (DE) .......................... 10 2009 032 262

(51) Int. Cl.
*G01B 11/14* (2006.01)

(52) U.S. Cl.
USPC .......................................................... 356/620

(58) Field of Classification Search
USPC ................................................. 356/601, 620
See application file for complete search history.

(56) References Cited

U.S. PATENT DOCUMENTS

| | | | | |
|---|---|---|---|---|
| 4,764,668 A * | 8/1988 | Hayard | 235/470 |
| 5,440,392 A * | 8/1995 | Pettersen et al. | 356/620 |
| 5,663,795 A * | 9/1997 | Rueb | 356/614 |
| 5,748,505 A * | 5/1998 | Greer | 702/104 |
| 5,831,735 A * | 11/1998 | Corby, Jr. | 356/620 |
| 5,956,417 A * | 9/1999 | Pryor | 382/154 |
| 6,166,809 A * | 12/2000 | Pettersen et al. | 356/612 |
| 6,279,246 B1 * | 8/2001 | van den Bossche | 33/556 |
| 6,389,158 B1 * | 5/2002 | Pettersen et al. | 382/154 |
| 6,456,339 B1 * | 9/2002 | Surati et al. | 348/745 |
| 6,615,112 B1 * | 9/2003 | Roos | 700/254 |
| 6,650,764 B1 * | 11/2003 | Wakashiro | 382/103 |
| 6,717,683 B1 * | 4/2004 | Wakashiro et al. | 356/614 |
| 6,809,728 B2 * | 10/2004 | Terauchi et al. | 345/420 |
| 6,901,673 B1 * | 6/2005 | Cobb et al. | 33/502 |
| 6,990,215 B1 * | 1/2006 | Brown et al. | 382/106 |
| 7,012,247 B2 * | 3/2006 | Tassakos et al. | 250/239 |
| 7,180,607 B2 * | 2/2007 | Kyle et al. | 356/614 |
| 7,307,737 B1 * | 12/2007 | Kling et al. | 356/614 |
| 7,372,581 B2 * | 5/2008 | Raab et al. | 356/614 |
| 7,398,928 B2 * | 7/2008 | Gaspard et al. | 235/462.03 |
| 7,414,732 B2 * | 8/2008 | Maidhof et al. | 356/601 |
| 7,557,936 B2 * | 7/2009 | Dickinson | 356/620 |
| 7,697,148 B2 * | 4/2010 | Lin | 356/614 |
| 7,869,026 B2 * | 1/2011 | Boyer et al. | 356/243.1 |
| 8,130,385 B2 * | 3/2012 | Satoh et al. | 356/620 |
| 2001/0024283 A1 * | 9/2001 | Granger | 356/620 |
| 2003/0090682 A1 * | 5/2003 | Gooch et al. | 356/620 |
| 2004/0150816 A1 * | 8/2004 | Wakashiro et al. | 356/243.1 |
| 2006/0007452 A1 * | 1/2006 | Gaspard et al. | 356/620 |
| 2006/0227210 A1 * | 10/2006 | Raab et al. | 348/139 |
| 2006/0265177 A1 * | 11/2006 | Steinbichler et al. | 702/150 |
| 2007/0211031 A1 * | 9/2007 | Marc | 345/163 |
| 2007/0242280 A1 * | 10/2007 | Dickinson | 356/620 |

(Continued)

*Primary Examiner* — Roy M Punnoose
(74) *Attorney, Agent, or Firm* — Dilworth & Barrese, LLP.

(57) ABSTRACT

A method serves for the determination of the 3D coordinates of an object. An improved method of this kind is characterized in that the object is surrounded by a plurality of reference probes having coded reference marks; and in that a plurality of shots are taken of the object such that a part of the object and a part of a reference probe is in each case included thereon.

20 Claims, 2 Drawing Sheets

U.S. PATENT DOCUMENTS

2008/0123110 A1* 5/2008 Dickinson et al. ............ 356/620
2009/0040536 A1* 2/2009 Chiu et al. .................... 356/620
2009/0080766 A1* 3/2009 Daxauer et al. ............... 382/154
2009/0161122 A1* 6/2009 Boyer et al. .................. 356/620

* cited by examiner

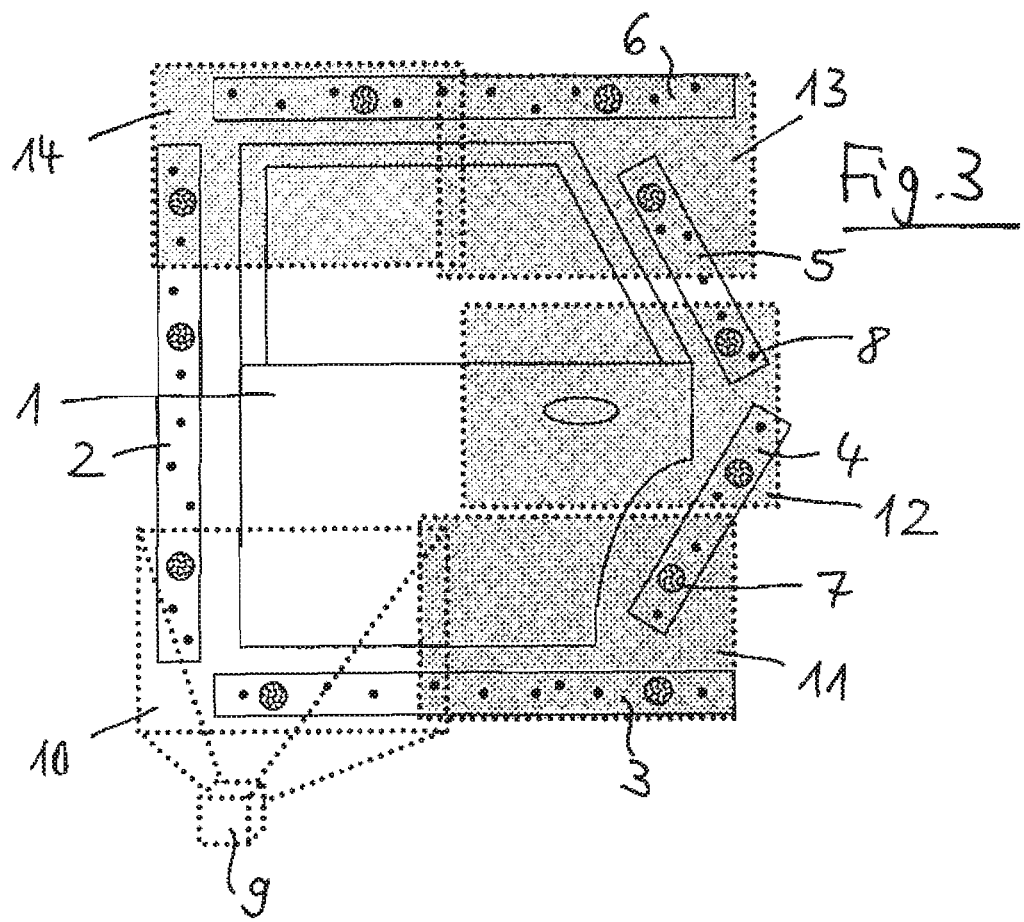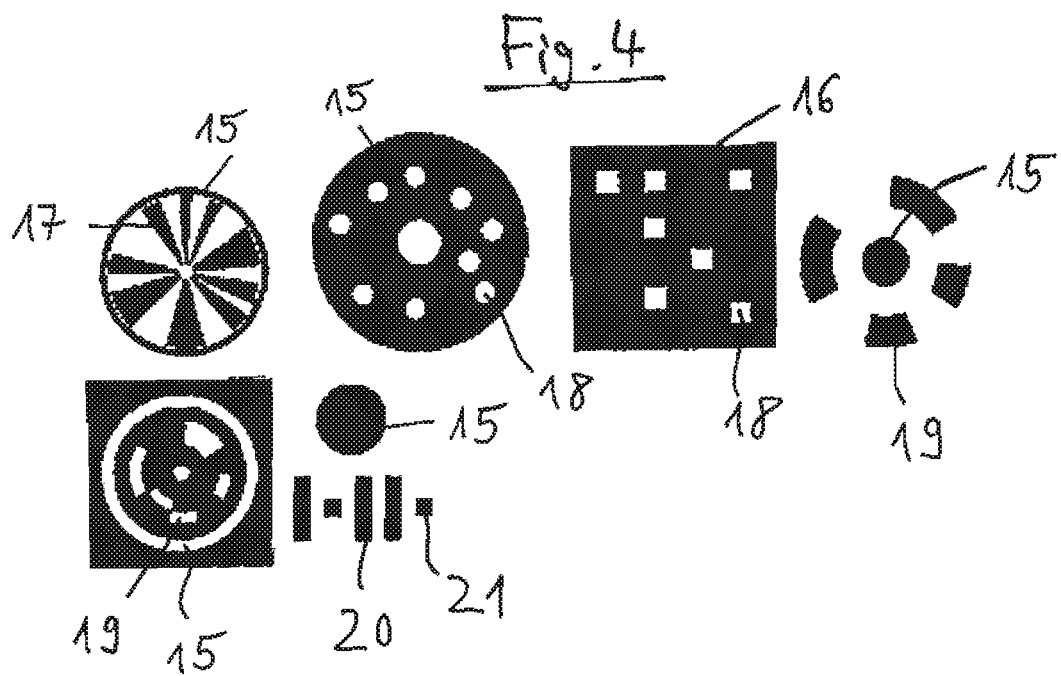

METHOD FOR THE DETERMINATION OF THE 3D COORDINATES OF AN OBJECT

BACKGROUND OF THE INVENTION

The invention relates to a method for the determination of the 3D coordinates of an object EP 553 266 B1 discloses a method for the determination of the 3D coordinates of an object which includes a scanner by which the object can be scanned. The 3D coordinates are determined in the scanner reference system by the scanner. A tracking system is furthermore present which can determine the position and direction of the scanner. The 3D coordinates of the object in the absolute reference system can be determined and recorded by a computer from the 3D coordinates in the scanner reference system and from the data of the position and direction of the scanner in the absolute reference system. The scanner can, however, be adapted such that it is movable independently with reference to the tracking system and to the object.

A method is known from U.S. Pat. No. 5,805,789 for determining the 3D coordinates of an object in which reference probes are fastened to an object. Absolute 3D coordinates are determined using a photogrammetric method.

DE 198 40 334 A1 discloses an apparatus for use as a navigation block in the measurement of objects using an optical three-dimensional coordinate measurement technique. The navigation block includes a component with a lattice structure to which a plurality of measurement marks are attached. A fastening apparatus for fastening to the object is attached to the side of the navigation block remote from the component.

WO 01/88471 A1 discloses a method for determining the 3D shape of an object in which the object is associated with a reference body which has reference objects. The object and the reference body are scanned by an optoelectronic sensor from whose measured signals the 3D coordinates of the surface points are calculated.

A method is known from EP 1 724 549 A2 for determining the 3D coordinates of an object in which the 3D coordinates of a part surface of the object are determined by a 3D measuring device whose position is determined by a tracking system. The 3D coordinates of a partially overlapping adjacent part surface of the object are subsequently determined. The 3D coordinates of the overlap region are assembled by a matching process.

EP 2 034 269 A1 discloses a method for three-dimensional digitizing of objects using a 3D sensor which includes a projector and one or more cameras. A pattern which is detected by the cameras is projected onto the object by the projector.

SUMMARY OF THE INVENTION

It is the object of the invention to provide an improved method for the determination of the 3D coordinates of an object.

This object is achieved in accordance with the invention by the features herein. A plurality of shots are taken of the object which is surrounded by a plurality of reference probes with encoded reference marks. These shots are taken such that in each case a part of the object and a part of a reference probe are included on them.

The method in accordance with the invention can be carried out on the basis of all known processes for the determination of the 3D coordinates of an object. Optical processes are particularly suited. An optical 3D sensor can be used for the carrying out of these optical processes. The optical 3D sensor can include a camera which can include an optical system and/or an areal sensor, in particular a CCD sensor. The 3D sensor can furthermore include one or more light sources.

It is advantageous if the position of the 3D sensor can be determined, in particular by a tracking system. It is possible in this manner that the 3D sensor can determine the relative 3D coordinates of the object in the reference system of the 3D sensor and that the absolute 3D coordinates of the object can be determined from these and from the absolute coordinates of the 3D sensor. Examples for this are described in EP 0 553 266 B1, EP 1 724 549 A2 and EP 2 034 269 A1, to which reference is made.

The optical 3D sensor can include a strip projection system, in particular a white light strip projection system. A strip pattern is projected onto the object by such a 3D sensor. The object is furthermore photographed. The photographs are evaluated. The photographs and the evaluations can be displayed and/or saved.

In the determination of the 3D coordinates, which can also be called 3D digitizing or measurement of the object, using a white light strip projection system and also using other systems, it is necessary to move the 3D sensor into different taking positions in space when the object to be measured is larger than the measurement field of the 3D sensor. The individual shots of the object have to be subsequently assembled. It is necessary for this purpose to register the individual shots in a higher-ranking coordinate system. The higher-ranking coordinate system is preferably an absolute coordinate system, for example the coordinate system of the space in which the object is located and in which the measurement of the object takes place. This so-called global registration requires a high precision.

In the case of white light strip projection, the assembly of the individual shots takes place in a high-ranking coordinate system, typically with the aid of photogrammetry, with reference marks having to be applied to the object or to a reference probe which is associated with the object. The marks must be measured separately with photogrammetric equipment. The process of photogrammetry provides a high precision, but has the disadvantage that an additional effort and/or expense is required for the preparation of the object with reference marks and for their separate measurement. It is furthermore necessary to manufacture reference probes adapted to the object to be measured onto which reference marks are applied which have to be measured photogrammetrically. The probes adapted to the object to be measured must be attached as closely as possible to and about the object. These probes, which can also be called full probes, admittedly allow the measurement of the object with high precision, but have the following disadvantages:

The construction of the full probes is orientated with respect to their size and design to the objects to be measured so that the full probes are expensive and awkward to handle with large measurement objects;

A separate probe has to be manufactured and photogrammetrically calibrated for each measurement object so that these probes represent a considerable cost factor in a plurality of different measurement objects;

the demands on the stability of the full probe are very high; it has to be configured mechanically in a very stable manner as a whole, which increases the weight and costs;

when the object type to be measured changes, the complete measurement assembly, including the awkward full probe, has to be converted;

the regular photogrammetric calibration of a full probe for the ensuring and monitoring of its precision is very complex and/or expensive due to size and weight aspects.

These disadvantages are avoided by the use of a plurality of reference probes which can also be called reference probe modules. A much simpler, less expensive and more variable measurement assembly is made possible by the use of a plurality of reference probes, said measurement assembly nevertheless ensuring a high precision of the measurement results.

The reference probes do not have to be fastened to the object. It is possible to arrange the reference probes at a spacing from the object.

The reference marks can be coded per se. It is, however, also possible, to use reference marks which are not coded per se, but which include a coding due to their relative arrangement to one another. With reference marks coded per se, it is sufficient to photograph this reference mark. Such a high number of measurement marks which are not coded per se must be included in a shot that the coding can be decoded from the relative position of these measurement marks with respect to one another.

The shots of the object can overlap. The object can be measured sectionally.

The part of the reference probe which is included on the shot preferably includes at least one coded reference mark. Such a part of a reference probe is preferably taken from which the position and/or the orientation of the reference probe can be determined.

It is furthermore advantageous if the reference probes are calibrated. This preferably takes place in that the position of all reference marks on the reference probe is determined in advance. The data of the positions of all reference marks with respect to the respective reference probe are preferably saved.

Advantageous further developments are described in the dependent claims.

It is advantageous if some or all of the reference probes are longer than the measurement field of the 3D sensor. The reference probes are therefore longer than the size of the region of the object taken on a shot. Advantages hereby result with large objects, that is, with objects for whose measurement a plurality of shots are required.

Some or all reference probes can be bar-shaped.

It is advantageous if shots which include a part, in particular an end, of a reference probe, include a part, in particular an end, of a further reference probe. This is in particular advantageous when the reference probes are bar-shaped. The further reference probe can be adjacent to the first reference probe. It is possible to interlink the reference probes with one another by the detection of reference probes. It is advantageous for this purpose if a respective part of both reference probes is photographed which includes at least one reference mark and/or a part from which the position and/or orientation of the respective reference probe and/or its reference marks can be determined.

The reference marks can b automatically decoded. It is, however, also possible to decode the reference marks manually. The reference marks can be associated by the decoding with a specific reference probe which can be identified by it.

Some or all shots can be linked with one another by a 3D matching process to increase the precision further.

It is advantageous if coded reference marks are also provided on the rear sides of some or all of the reference probes. The rear side of the object can then also be measured with the same measuring assembly.

A further advantageous further development is characterized in that the positions of the reference marks are detected and stored in a first measurement run. The first measurement run can be carried out without measuring the object. It is, however, also possible also to measure an object in this first measurement run. The detected positions of the reference marks can be transformed into the higher-ranking coordinate system. The detected and/or transformed positions can be saved.

It is advantageous if further measurement runs are carried out on the basis of stored positions of the reference marks. This is in particular advantageous when the positions of the reference marks are detected in a first measurement run and are optionally transformed and saved. Measurement time can be saved by the use of the stored positions of the reference marks.

BRIEF DESCRIPTION OF THE DRAWINGS

An embodiment of the invention will be explained in detail in the following with reference to the enclosed drawing. There are shown in the drawing FIG. 1 a measurement assembly with an object to be measured and a plurality of reference probes in a schematic view from the front;

FIG. 3 the measurement assembly in accordance with FIG. 1 in a modified representation; and FIG. 4 different types of reference marks.

DESCRIPTION OF THE PREFERRED EMBODIMENTS

Figure 1:
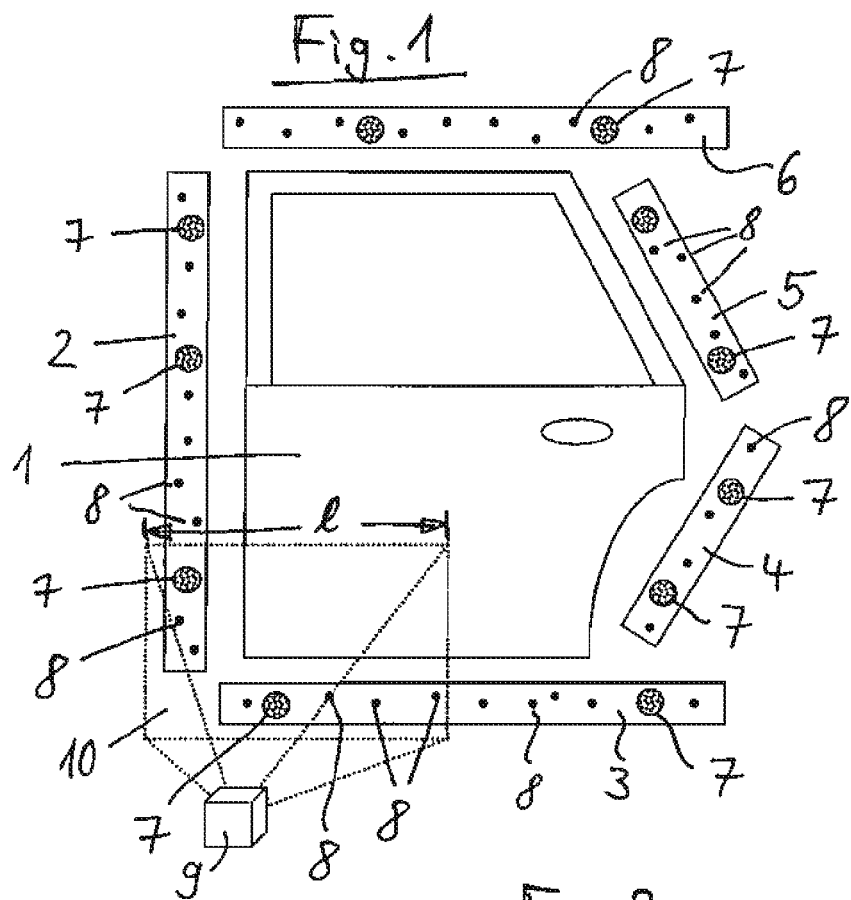

The measurement assembly shown in FIG. 1 serves to determine the 3D coordinates of the front side of an object 1, namely of a motor vehicle door (body shell door). The object 1 is surrounded by five reference probes 2, 3, 4, 5, 6. Each reference probe 2-6 has reference marks, namely reference marks 7 which are coded per se and reference marks 8 which are not coded per se, but which are arranged relative to one another in space such that this spatial arrangement includes a coding.

The reference probes 2-6 are bar-shaped.

A 3D sensor 9 is present to take photographs of the object and includes a white light strip projection system and a camera with an optical system and a CCD sensor. An apparatus, namely a tracking system, is furthermore provided with which the position and orientation of the 3D sensor 9 can be determined in a higher-ranking coordinate system (not shown in the drawing). The absolute coordinates of the object 1 and of the reference probes 2-6 can be determined in this manner.

The reference probes 2-6 have been measured. The result of this measurement is stored in a control system which can include a computer, in particular a PC (not shown in the drawing). The result of the measurement of the reference probes 2-6 includes a clear association of the respective reference marks 7, 8 with a specific reference probe 2-6, which can be identified in this manner, and the position coordinates of the respective reference marks 7, 8 on the respective reference probe 2-6.

The reference probes 2-6 are not fastened to the object 1. They are arranged in the proximity of the object 1, and indeed in a manner such that they surround the object 1, as shown in FIG. 1. For this purpose, reference objects with different lengths can be provided, namely reference objects 2, 3, 6 which are longer than the length l of the measurement field of the 3D sensor and short reference marks 4, 5 which are shorter than the length l. The reference probes 2, 3, 6 are therefore longer than the size l of the region of the object 2 taken in a shot.

The reference probes 2-6 are located in a position not exactly calibrated. They surround the object 1, but do not initially have to be positioned at exactly predetermined points.

A plurality of shots of the object 1 are taken by the 3D sensor 9. This is shown in FIG. 3 where the measurement fields of the shots 10, 11, 12, 13, 14 taken after one another are shown. Each of the shots 10-14 includes a part of the object 1 and a part of a reference probe 2-6. All the shots 10-14 include a part including an end of a first reference probe and a part including an end of a further reference probe. The shot 10 includes a part, namely an end, of the reference probe 2 and a part, namely an end, of the reference probe 3. The shot 11 includes parts or ends of the reference probes 3 and 4. The shot 12 includes parts or ends of the reference probes 4 and 5. The shot 13 includes parts or ends of the reference probes 5 and 6. The shot 14 includes parts or ends of the reference probes 6 and 2. It is, however, also possible that shots only include a part of only one reference probe (not shown in the drawing).

The shots overlap in part. The shots 10 and 11 overlap, as do the shots 13 and 14. Shot 12 does not overlap with further shots. Mutually overlapping shots can be interlinked with one another. If shots do not overlap, the 3D coordinates of the regions between the shots are not determined. These regions can be regions not of interest.

Each shot includes reference marks 7, 8. The association of the size of the shots and of the distribution of the reference marks 7, 8 is such that in each shot 10-14 of each reference probe 2-6 their position and orientation can be determined. Shot 10, for example, includes a reference mark 7 coded per se and four reference marks 8 not coded per se, wherein, however, these reference marks 8 not coded per se can be decoded by the location of their positions. In the same way, shot 10 includes a reference mark 7 coded per se and two reference marks 8 of the reference probe 2 not coded per se. The same applies accordingly to the remaining shots 11 to 14 and to the remaining reference probes 4 to 6.

In a first measurement run, the positions of the reference marks 7, 8 are detected and saved. The 3D coordinates of the object 1 can also be determined during this first measurement run.

If further objects should subsequently be measured, the stored positions of the reference marks 7, 8 can be used for this purpose. It is therefore possible to remove the object 1, with the location of the reference probes 2-6 to one another and thus also the location of the reference marks 7, 8 not being changed. Subsequently, a further, similar measurement object is positioned in a similar manner within the reference probes 2-6. This further object can then be measured. This further measurement run and still further measurement runs can be carried out on the basis of the stored positions of reference marks 7, 8. Since the stored positions of the reference marks 7, 8 are used, the measurement time can be shortened.

Figure 2:
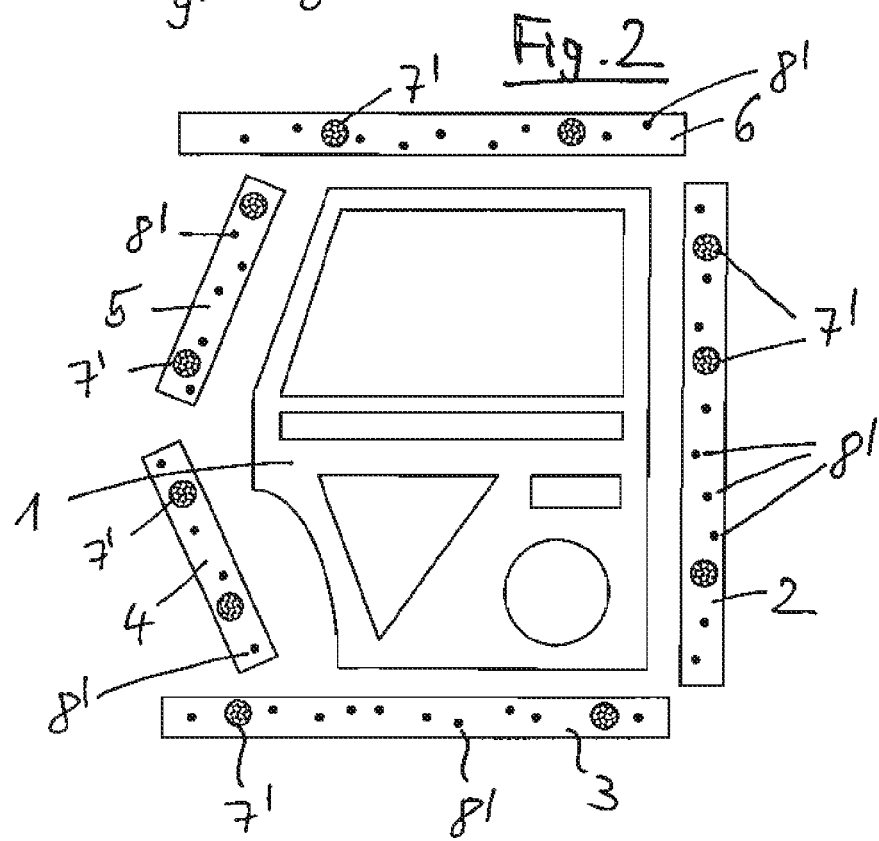
FIG. 2 the measurement assembly in accordance with FIG. 1 in a view from behind.

As can be seen from FIG. 2, coded reference marks are also provided on the rear sides of the reference probes 2-6, namely reference marks 7' coded per se and reference marks 8' not coded per se which are coded by their spatial locations relative to one another. It is possible in this way also to measure the rear side of the object 1 using the same measurement assembly. The described first-time measurement run of the front sides of the reference probes 2-6 is in particular also sufficient for the complete detection and saving of the reference marks 7', 8' on the rear sides of the reference probes 2-6. For this purpose, the reference marks 7', 8' on the rear sides of the reference probes 2-6 were also measured in advance, and indeed both with respect to their positions toward one another and with respect to their positions with respect to the reference marks 7, 8 on the front side of the respective reference probe 2-6.

FIG. 4 shows different embodiments of reference marks 7, 7' coded per se. Each reference mark includes an unchanged non-coding elements and coding elements. The non-coding element can comprise a circle 15 or a square 16 or a rectangle. This element determines the position of the respective reference mark. The coding elements can comprise a circular barcode 17, a dot pattern 18 of round or square dots, segment sections 19 or a pattern of dots 20 and lines 21. The coding parts enable an identification of the respective reference mark.

In accordance with the invention, a plurality of reference probes are used which can be flexibly combined and which are arranged in front of the measurement around the object to be measured. During the measurement of the object and possibly of further objects, the reference probes are then no longer changed in their locations. A plurality of different measurement objects can be measured with a set of reference probes.

Coded reference marks are applied to the reference probes. They can be photogrammetric marks which are coded per se and photogrammetric marks which are not coded per se, but by their locations relative to one another. The reference marks on the reference probes are calibrated, for example with the help of photogrammetry. An exact 3D point list, stable per se, is present for each reference probe in this manner. The photogrammetric calibration of each individual reference probe is only necessary once. The point list measured once is saved.

The object can be measured sectionally using the 3D sensor, with both a part of the object and a part of the reference marks on one or more reference probes being detected in every single shot of the 3D sensor. The reference probes are designed at least partly in their lengths so that they are much larger than the measurement field of the 3D sensor so that a plurality of shots of the 3D sensor next to one another can be linked via a reference probe and thus a high precision is also achieved in the linking of a plurality of measurement fields.

The identification of the individual reference probes takes place in a self-actuating (automatic) manner or manually in the measurement scene of the 3D sensor either via the analysis of the geometrical arrangement of the reference marks not coded per se or with the help of the reference marks coded per se, which enables a simpler and more reliable identification.

A check is made after the first measurement as to which reference probe or which reference probes was or were respectively detected beside the object in the respective shot, and indeed by the evaluation of the reference marks coded per se and/or by the evaluation or analysis of the geometrical arrangement of the reference marks not coded per se. The respective 3D point list is subsequently transformed into the coordinate system of the first measurement. Each further measurement can now be transformed into this coordinate system provided that reference marks of an already transformed reference probe are detected. A check is made after every measurement whether further, previously still not detected reference marks and/or reference probes were measured. They are then optionally transformed into the measurement scene. To increase the precision, the complete association of all measured object sections, that is, the complete association of all shots, can be mutually balanced together with the detected reference probes and/or reference marks via a 3D matching process.

It is possible by the attachment of reference marks to all sides of the reference probes, that is, also on their rear sides, to measure the front side and the rear side of an object in a common coordinate system.

After completion of the measurement at the object and of the thus present combined and mutually aligned point list of all reference probes and of their reference marks, it is possible already to upload the complete list of the reference probes and/or reference marks already at the start of the measurement sequence completely for repeat measurements at further objects of the same type and to save the transformation procedure of the individual reference probes and/or of the reference marks in the repeat measurements. This requires that the location of the reference probes has not been changed for the repeat measurement.

The invention claimed is:

1. A method for the determination of the 3D coordinates of an object, comprising the steps of:
    surrounding the object by a plurality of reference probes having coded reference marks, the reference probes being unconnected the object; and
    taking a plurality of shots of the object such that a part of the object and a part of a reference probe are in each case included thereon; and
    determining the 3D coordinates of the object based on reference marks included in at least one of the plurality of shots.

2. A method in accordance with claim 1, wherein some or all of the reference probes are longer than the measurement field of the 3D sensor.

3. A method in accordance with claim 1, wherein some or all of the reference probes are of bar shape.

4. A method in accordance with claim 1, wherein shots which include at least an end of a reference probe, include at least an end of a further reference probe.

5. A method in accordance with claim 1, wherein the reference marks are automatically decoded.

6. A method in accordance with claim 1, wherein some or all of the shots are linked to one another by a 3D matching process.

7. A method in accordance with claim 1, wherein coded reference marks are also provided on the rear sides of some or all of the reference probes.

8. A method in accordance with claim 1, wherein the positions of the reference marks are detected and saved in a first measurement run.

9. A method in accordance with claim 1, wherein further measurement runs are carried out on the basis of stored positions of the reference marks.

10. A method in accordance with claim 2, wherein some or all of the reference probes are of bar shape.

11. A method in accordance with claim 10, wherein shots which include at least an end of a reference probe, include at least an end of a further reference probe.

12. A method in accordance with claim 2, wherein shots which include at least an end of a reference probe, include at least an end of a further reference probe.

13. A method in accordance with claim 3, wherein shots which include at least an end of a reference probe, include at least an end of a further reference probe.

14. A method in accordance with claim 13, wherein the reference marks are automatically decoded.

15. A method in accordance with claim 12, wherein the reference marks are automatically decoded.

16. A method in accordance with claim 11, wherein the reference marks are automatically decoded.

17. A method in accordance with claim 10, wherein the reference marks are automatically decoded.

18. A method in accordance with claim 4, wherein the reference marks are automatically decoded.

19. A method in accordance with claim 3, wherein the reference marks are automatically decoded.

20. A method in accordance with claim 2, wherein the reference marks are automatically decoded.

* * * * *